United States Patent [19]

Tokunaga

[11] Patent Number: 5,111,231
[45] Date of Patent: May 5, 1992

[54] CAMERA SYSTEM

[75] Inventor: Tatsuyuki Tokunaga, Kanagawa, Japan

[73] Assignee: Canon Kabushiki Kaisha, Tokyo, Japan

[21] Appl. No.: 557,172

[22] Filed: Jul. 23, 1990

[30] Foreign Application Priority Data

Jul. 27, 1989 [JP] Japan .................................. 1-192546
Jul. 27, 1989 [JP] Japan .................................. 1-192547
Jul. 27, 1989 [JP] Japan .................................. 1-192548

[51] Int. Cl.⁵ .......................... G03B 7/08; G03B 7/28; G03B 15/05
[52] U.S. Cl. .................................. 354/402; 354/416; 354/432
[58] Field of Search ............... 354/402, 403, 416, 417, 354/413, 429, 432, 431

[56] References Cited

U.S. PATENT DOCUMENTS

| | | | |
|---|---|---|---|
| 4,423,936 | 1/1984 | Johnson | 354/403 |
| 4,470,681 | 9/1984 | Johnson | 354/403 |
| 4,959,676 | 9/1990 | Matsuda et al. | 354/432 X |
| 4,959,678 | 9/1990 | Nakagawa | 354/403 |
| 4,974,007 | 11/1990 | Yoshida | 354/402 |
| 4,977,423 | 12/1990 | Yamano et al. | 354/402 |
| 4,984,006 | 1/1991 | Ikemura et al. | 354/432 X |

Primary Examiner—W. B. Perkey
Attorney, Agent, or Firm—Robin, Blecker, Daley & Driscoll

[57] ABSTRACT

A camera system of the kind adjusting flash light quantity comprises a focus detecting circuit which detects the focused state of each of a plurality of areas arranged within an image field, and a light measuring circuit which measures the luminance of each of the areas of the image field respectively. In the camera system, the light measurement outputs obtained from these areas are individually weighted according to the focused states of the areas detected, and the quantity of flash light is adjusted on the basis of the weighted outputs of the light measuring circuit.

17 Claims, 16 Drawing Sheets

F I G. 5

| | IN-FOCUS ZONE | | DEFOCUS ZONE | LIGHT EMISSION STOP CONTROL |
|---|---|---|---|---|
| IN CASE OF BOTH IN-FOCUS AND DEFOCUS ZONES | ADEQUATE | | GIVEN STEP OVER | OR |
| IN CASE OF PLURALITY OF ZONES WITHIN DEPTH OF FIELD | NEAR OBJECT | FAR OBJECT | GIVEN STEP OVER | OR |
| | GIVEN STEP OVER | ADEQUATE | | |

* "ADEQUATE" : LIGHT ADJUSTMENT GAIN IS SET TO HAVE CMP SIGNAL PRODUCED WHEN IMAGE PLANE LIGHT QUANTITY BECOMES ADEQUATE.

* "GIVEN STEP OVER" : LIGHT ADJUSTMENT GAIN IS SET TO HAVE CMP SIGNAL PRODUCED WHEN IMAGE PLANE LIGHT QUANTITY BECOMES OVER BY A GIVEN NUMBER OF STEPS.

* "OR" IN "LIGHT EMISSION STOP CONTROL" : STP SIGNAL FOR STOPPING LIGHT EMISSION IS PRODUCED WHEN ANY OF SIGNALS CMP1 TO CMP3 IS PRODUCED.

FIG.6(c)

S6-1: SET AT A THE GAINS OF LIGHT ADJUSTMENT SENSORS IN POSITIONS CORRESPONDING TO DEFOCUS AREAS SELECTED AT S5-2 AND S5-4

S6-2: SET AT B (A>B) THE GAIN OF LIGHT ADJUSTMENT SENSOR OTHER THAN THE SENSORS SET AT S6-1

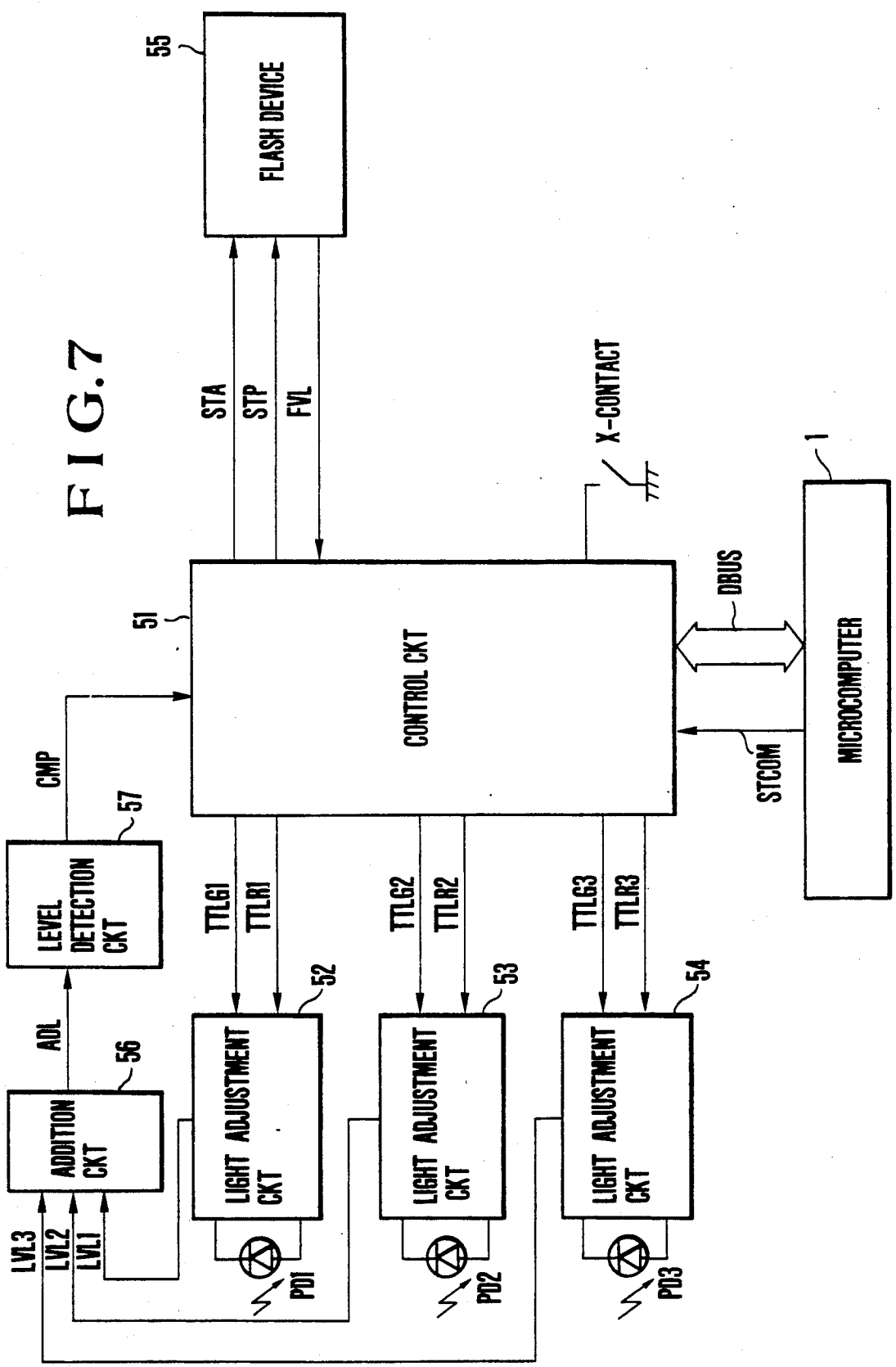

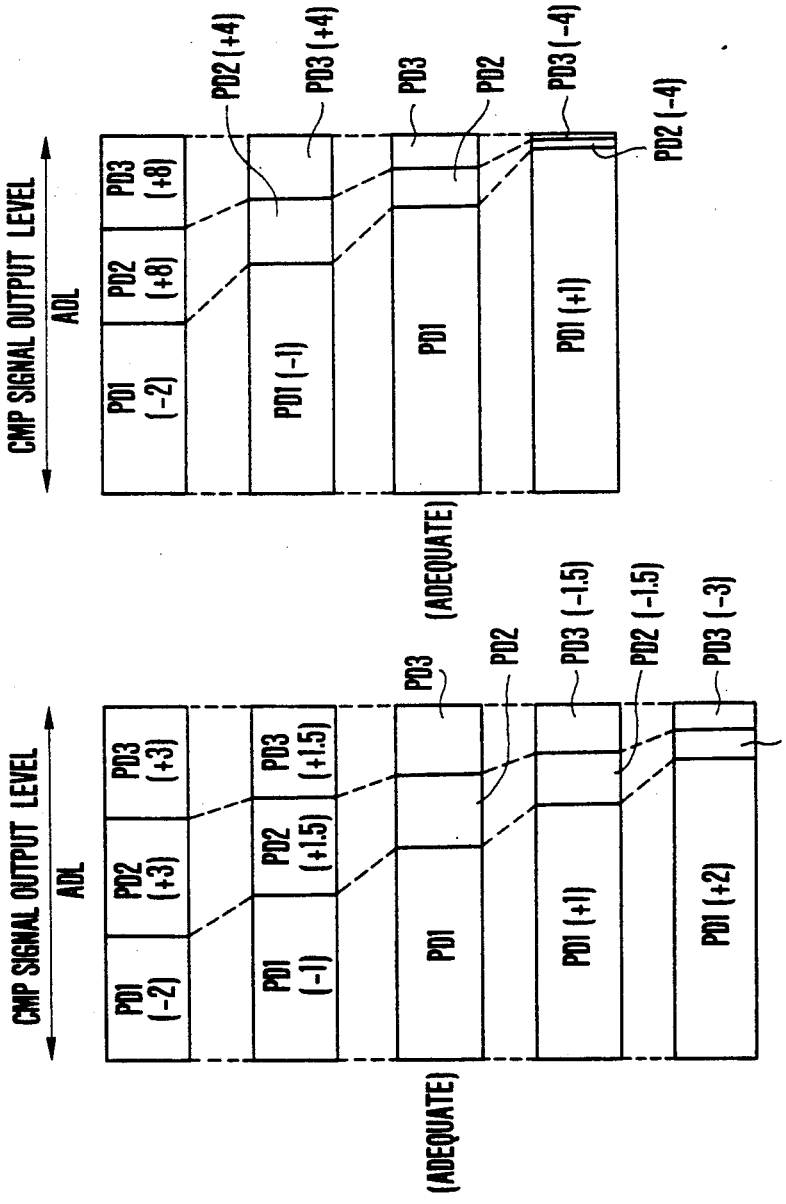

FIG.9(c)

DETERMINATION AT STEP S9

| MODE | PROCEEDING DIRECTION |
|---|---|
| ONE-SHOT | D |
| PREDICTIVE SERVO | E |

FIG.9(b)

DETERMINATION AT STEP S5

| MODE | STATE | PROCEEDING DIRECTION |
|---|---|---|
| ONE-SHOT | FOCUS HELD | A |
| ONE-SHOT | FOCUS NOT HELD | C |
| PREDICTIVE SERVO | UNPREDICTABLE | B |
| PREDICTIVE SERVO | PREDICTABLE | C |

WHEN AF IS LOCKED

LIGHT ADJUSTMENT SENSOR SENSITIVE AREAS (CHANGE FRAMING)

IMMEDIATELY BEFORE RELEASE

AT THE TIME OF EXPOSURE

FIG.11(c)

DETERMINATION AT STEP S10

| MODE | PROCEEDING DIRECTION |
|---|---|
| ONE-SHOT | D |
| PREDICTIVE SERVO | E |

FIG.11(b)

DETERMINATION AT STEP S5

| MODE | STATE | PROCEEDING DIRECTION |
|---|---|---|
| ONE-SHOT | FOCUS HELD | A |
| ONE-SHOT | FOCUS NOT HELD | C |
| PREDICTIVE SERVO | UNPREDICTABLE | B |
| PREDICTIVE SERVO | PREDICTABLE | C |

FIG.12(a)
MAIN OBJECT POSITION OBTAINED BY DETERMINING FOCUSED STATE ON THE BASIS OF DISTANCE MEASURED BEFORE RELEASE
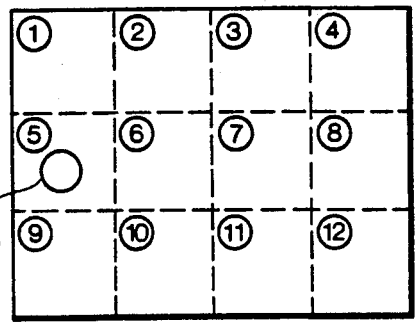
MAIN OBJECT
FIG.12(b)
RELEASE BEGINS
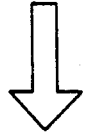
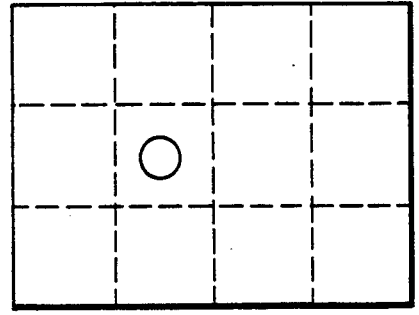
FIG.12(c)
MAIN OBJECT POSITION OBTAINED BY DETERMINING FOCUSED STATE ON THE BASIS OF RESULT OF PREDICTIVE COMPUTATION AT THE TIME OF EXPOSURE
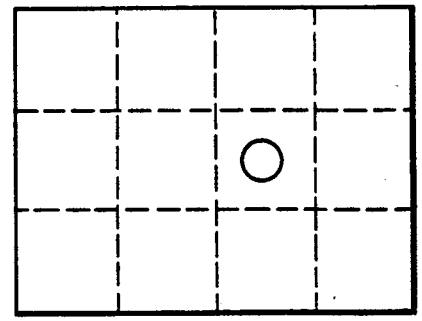

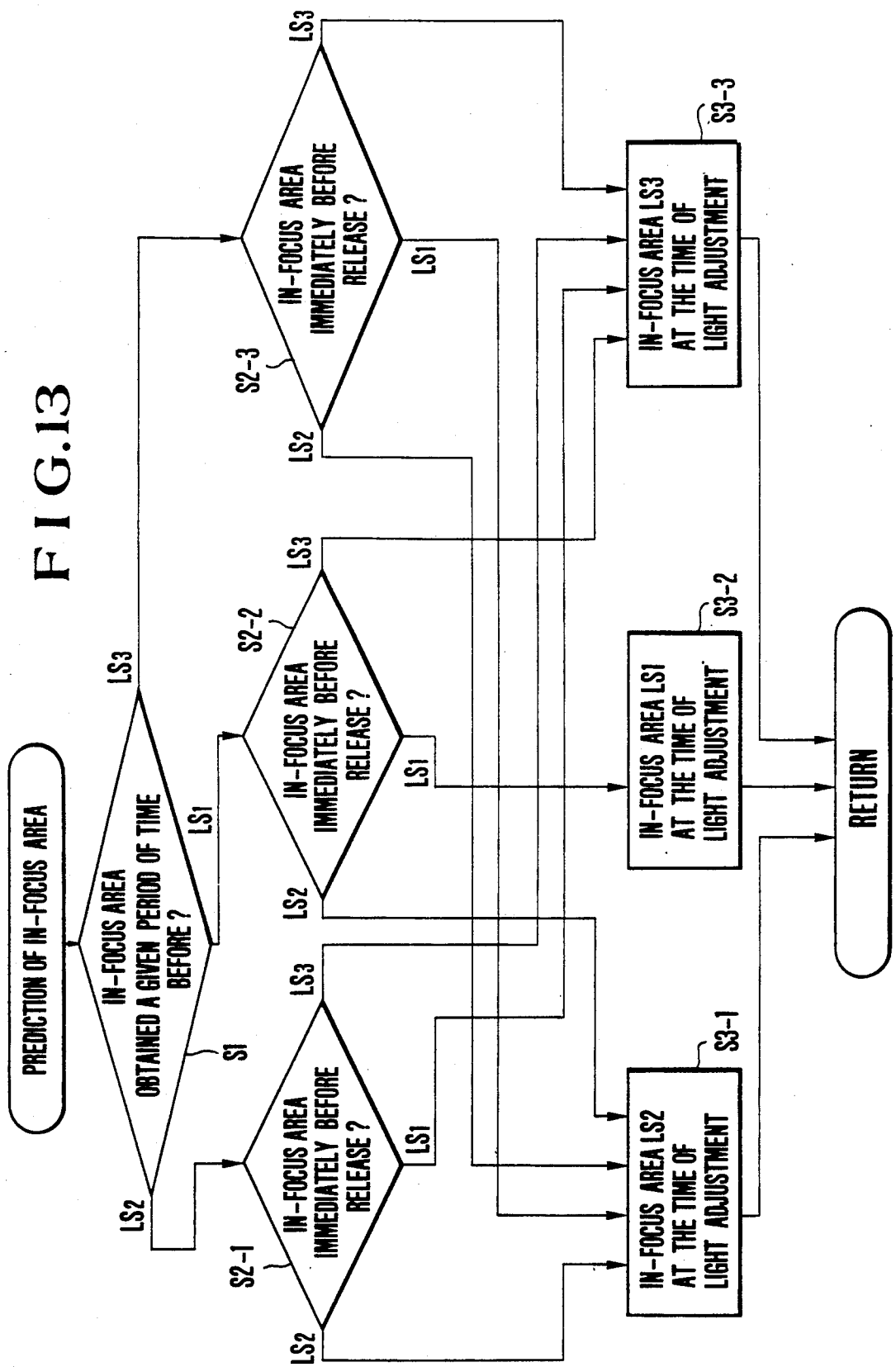

CAMERA SYSTEM

BACKGROUND OF THE INVENTION

1. Field of the Invention:

This invention relates to a multi-light-adjusting type camera arranged to project light from a flash light emitting part to an object to be photographed, to measure the reflected light of the projected light in a plurality of areas and to determine, according to the results of light measurement, the amount of light to be emitted from the flash light emitting part.

2. Description of the Related Art:

Many of cameras in the market are of the light-adjusting type determining the amount of flash light according to the measured value of intensity (quantity) of a reflected light obtained by tentatively projecting light from a flash light emitting part to an object and by measuring the reflection light thus obtained.

Most of them adjust the light by measuring reflected light with a single light measuring sensor in such a way as to attach weight to the central part of an image plane. Therefore, an adequate degree of exposure can be obtained if a main object to be photographed is located in the central part of the image plane in a suitable size. However, in cases where the main object is not located in the central part of the image plane or where the object is too small relative to the size of the image plane, it is hardly possible to obtain an adequate degree of exposure because of the adverse effect of the light quantity of a background.

To solve this problem, a multi-light-adjusting type camera has been proposed in Japanese Laid-Open Patent Application No. SHO 60-108827. This camera is arranged to determine and control the amount of flash light to be emitted by arranging a plurality of light measuring sensors and by variably controlling them. This camera, however, necessitates the photographer to manually set a weight attaching part of the image plane. The photographer is thus required to perform a troublesome operation.

Another camera which has been disclosed in Japanese Laid-Open Patent Application No. SHO 55-135823 is arranged as follows: The light of the object is measured without flashing and also with flashing. The measured light values thus obtained are compared with each other. Then, an area having the image of an object which is located nearest the camera is selected according to the result of comparison. The amount of flash light to be emitted is controlled on the basis of the measured light value of that area. In accordance with this method, the degree of exposure becomes apposite to the nearest object. However, it becomes inadequate if a main object is not the nearest object. In addition to this, the method does not take into consideration any balanced relation to the background. Further, in accordance with this method, a flash light emitting action must be performed once before photographing, thus necessitating additional consumption of the electric energy of the power source.

Further, a method of measuring the light values of a plurality of areas of the image plane and making an exposure on the basis of the measured light value of one of the areas corresponding to a distance measuring area has been disclosed in U.S. Pat. No. 4,796,043. However, this prior art disclosure includes nothing about any arrangement to measure the light of an object illuminated by flash light and to control the amount of flash light according to the result of measurement.

Most of the cameras of these days are arranged to have an automatic focusing (hereinafter referred to as AF) mode including a mode in which an in-focus state is held unchanged once the lens is correctly focused (hereinafter referred to as one-shot mode). In the one-shot mode, it is possible to perform photographing, for example, by performing distance measurement by temporarily bringing a main object to a central part of the image plane and, after that, by readjusting the framing of the shot. In such a case, however, an exposure cannot be made appositely to the main object if it is not the nearest object. Even if the main object is located nearest the camera, a picture taken in accordance with the method does not always have the object and the background thereof in a well balanced state.

The cameras of these days include some cameras having such an AF mode that is arranged as follows: The distance measurement is repeatedly performed and the movement of the object is predicted in such a way as to have the lens focused on the object at the time of shutter release on the basis of current and past measured distance values (hereinafter referred to as a predictive servo mode). However, there has been proposed no method for exposure control over flash photography to be performed in the predictive servo mode with balance between the object and the background taken into consideration.

Summary of the Invention

It is a first object of the present invention to provide a flash photographing system which is arranged to detect the focused state of image obtained in each of a plurality of areas of an image plane and to adjust, according to the result of focus detection, a control action performed on the amount of flash light on the basis of measured light values obtained for the plurality of areas.

It is a second object of the invention to provide a flash photographing system which is arranged under the first object to perform a focusing action on the basis of the above-stated focused state as detected and to control and adjust the above-stated amount of flash light differently for any area found to be in focus from control and adjustment for other areas.

It is a third object of the invention to provide a camera system which is arranged to detect a focused state of image obtained in each of a plurality of areas of an image plane; to perform a focusing action on the basis of the result of focus detection obtained from a specific area; to hold an in-focus position thus obtained for the specific area; to further perform focus detection for each of the areas even after holding the in-focus position; and to evaluate measured light values of these areas on the basis of the result of focus detection obtained from each of the areas after holding the in-focus position.

It is a fourth object of the invention to provide a camera system which is arranged to repeatedly detect the focused state of image obtained in each of a plurality of areas of an image plane; to predict, from the results of the past focus detection, the focused state which will be obtained in each area after the lapse of a given time; and to evaluate the measured light value of each areas on the basis of the focused state as predicted.

These and further objects and features of this invention will become apparent from the following detailed description of embodiments thereof taken in connection with the accompanying drawings.

BRIEF DESCRIPTION OF THE DRAWINGS

FIG. 5 shows a relation obtained by the embodiment of this invention among a focused state, a light adjustment gain and flashing stop control.

FIGS. 6(a), 6(b) and 6(c) are flow charts showing a series of operations performed by the first embodiment of the invention shown in FIG. 1.

FIG. 7 is a block diagram showing by way of example the arrangement of a flash light adjusting control circuit included in a second embodiment of the invention.

FIGS. 8(a) and 8(b) show changes of light quantity of each zone on an image plane resulting from weight attached to light adjustment gain by the second embodiment.

FIGS. 9(a), 9(b) and 9(c) show in a flow chart with related illustrations the operation of a third embodiment of the invention.

FIGS. 11(a), 11(b) and 11(c) show in a flow chart with related illustrations the operation of a fourth embodiment of the invention.

FIGS. 12(a), 12(b) and 12(c) show the operation of the fourth embodiment performed according to the flow chart of FIG. 11(a).

FIG. 13 is a flow chart showing the details of the step S10 of FIG. 11(a).

DETAILED DESCRIPTION OF THE PREFERRED EMBODIMENTS

Figure 1:
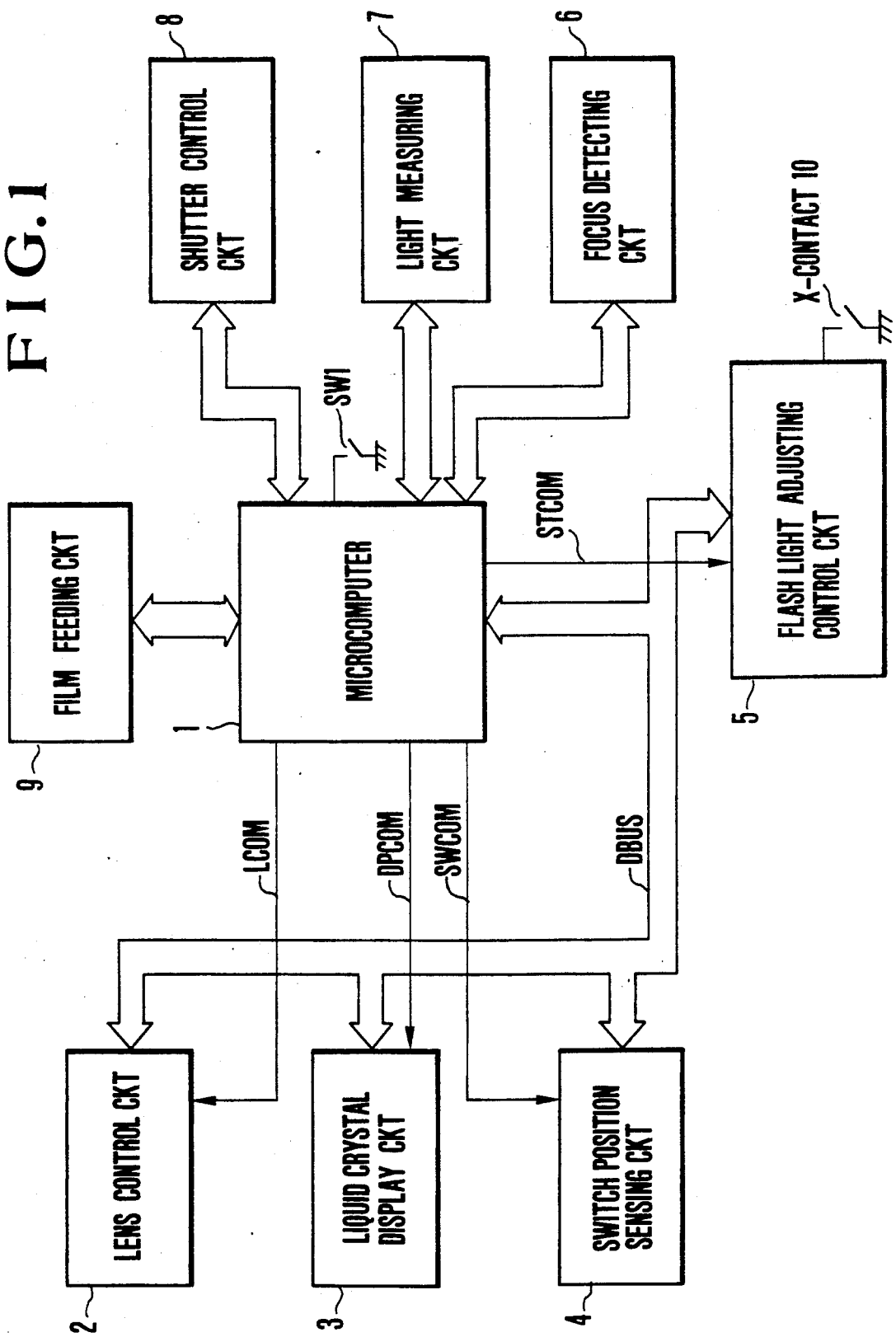
FIG. 1 is a block diagram showing a flash photographing system which is arranged according to this invention as an embodiment thereof.

FIG. 1 shows in a block diagram the arrangement of a first embodiment of this invention. Referring to FIG. 1, a microcomputer 1 is arranged to control the operation of each component part of the embodiment. A lens control circuit 2 is arranged to drive and control a focus adjusting motor which is arranged to adjust the focus of a photo-taking lens (not shown) and also a diaphragm blade controlling motor. The lens control circuit 2 conducts serial communication with the microcomputer 1 via a data bus DBUS so long as a signal LCOM is supplied from the microcomputer 1. The circuit 2 receives motor driving information through the serial communication and drives and controls the above-stated motors on the basis of the received information. Further, the lens control circuit 2 sends lens information of varied kinds to the microcomputer 1 through the serial communication. A liquid crystal display circuit 3 is arranged to drive a liquid crystal display device which is not shown but is arranged to inform the photographer of photographic information of varied kinds such as a shutter speed and an aperture value. The display circuit 3 conducts serial communication with the microcomputer 1 via the data bus DBUS so long as it receives a signal DPCOM from the microcomputer 1. Upon receipt of display data through the serial communication, the display circuit 3 drives the liquid crystal display device in accordance with the display data.

A switch position sensing circuit 4 is arranged to read out the position of a switch which is provided for allowing the photographer to manually set various photographing conditions and also the position of a switch which indicates the condition of the camera and to send the results of reading to the microcomputer 1. The sensing circuit 4 supplies the microcomputer 1 with the switch data through serial communication conducted with the latter via the data bus DBUS so long as the circuit 4 is receiving a signal SWCOM from the microcomputer 1.

A flash light adjusting control circuit 5 is arranged for controlling a flashing (or flash light emitting) action and the function of stopping flash light emission according to TTL (through-the-lens) light adjustment. As long as a signal STCOM is received from the microcomputer 1, the circuit 5 conducts serial communication with the microcomputer 1 via the data bus DBUS and performs control of varied kinds by receiving data relative to flash control. A focus detecting circuit 6 is composed of a line sensor which is provided for an AF action performed by a known phase difference detecting method and a circuit which is provided for reading data accumulated by the line sensor. The focus detecting circuit 6 operates under the control of the microcomputer 1.

A light measuring circuit 7 is arranged to measure the light of an image field under the control of the microcomputer 1. The light measurement output of the circuit 7 is sent to the microcomputer 1 to be used in setting exposure conditions after A/D conversion. A shutter control circuit 8 is arranged to control in accordance with a control signal from the microcomputer 1 the leading and trailing curtains of a shutter which are not shown.

A film feeding circuit 9 is arranged to control a feed motor (not shown) in accordance with a control signal from the microcomputer 1 for winding and rewinding the film. An X-contact is arranged to turn on to inform the flash light adjusting control circuit 5 of timing for flashing when the travel of the leading shutter curtain is completed. A switch SW1 is interlocked with a shutter release button. Upon confirmation of turning-on of the switch SW1, the microcomputer 1 initiates an exposure.

Figure 2:
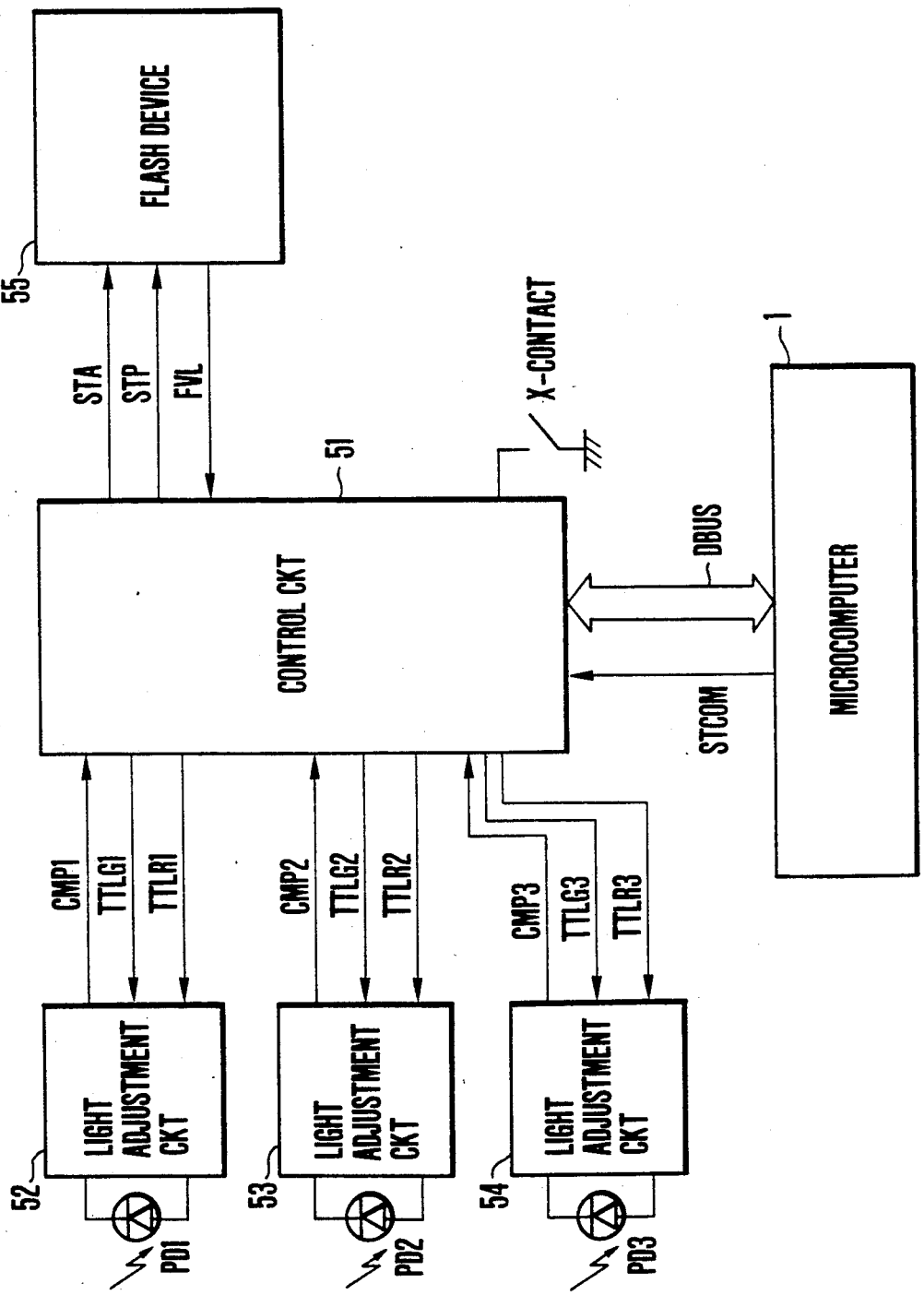
FIG. 2 is a block diagram showing by way of example the arrangement of a flash light adjusting control circuit shown in FIG. 1.

FIG. 2 is a block diagram showing by way of example the arrangement of the above-stated flash light adjusting control circuit 5. Referring to FIG. 2, a control circuit 51 is arranged to exchange data with the microcomputer 1 through the serial communication and to control light adjustment circuits 52, 53 and 54 and a flash device 55.

Each of the light adjustment circuits 52, 53 and 54 consists of a logarithmic compression amplifier, an expanding transistor, integrating capacitor, etc., and is arranged to begin to adjust light in response to the signal TTLR; to amplify by means of the logarithmic compression amplifier the quantity of light of an image plane on the film which is received after it has been photoelectrically converted by a photodiode PD (hereinafter referred to as a light adjustment sensor); to give a gain by means of the expanding transistor to the light quantity input in accordance with the value of the signal TTLG (gain information for light adjustment); and to integrate the input by means of the integrating capacitor. When the electric charge of the integrating capacitor comes to exceed a given value, a signal CMP is supplied to the control circuit 51.

The flash device 55 is arranged in a known manner. When electric charge is accumulated sufficiently for flashing, a signal FVL is supplied to the control circuit 51 to inform the latter of completion of the charging process. Following this, when the control circuit 51 sends a signal STA, the flash device 55 begins to flash. The flash device 55 stops flashing when a signal STP is received from the control circuit 51.

Figure 3:
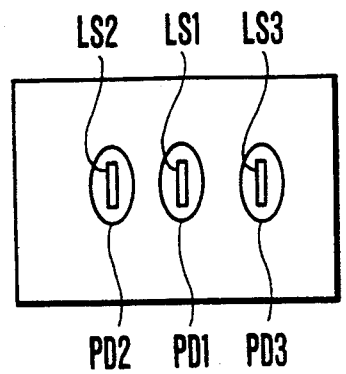
FIG. 3 shows the sensitive areas of light adjustment sensors in relation to focus detecting line sensors.

FIG. 3 shows the sensitive areas of the light adjustment sensors PD and those of focus detecting line sensors which will be described later. The light adjustment sensors PD1, PD2 and PD3 are opposed to the film surface within the camera and have their sensitive areas arranged relative to the image plane as shown in FIG. 3. Focus detecting line sensors LS1, LS2 and LS3 which are arranged in combination with an optical system (not shown) have sensitive areas arranged relative to the image plane as shown in FIG. 3. These line sensors correspond to the sensitive areas of light adjustment sensor PD1, PD2 and PD3 respectively.

Figure 4:
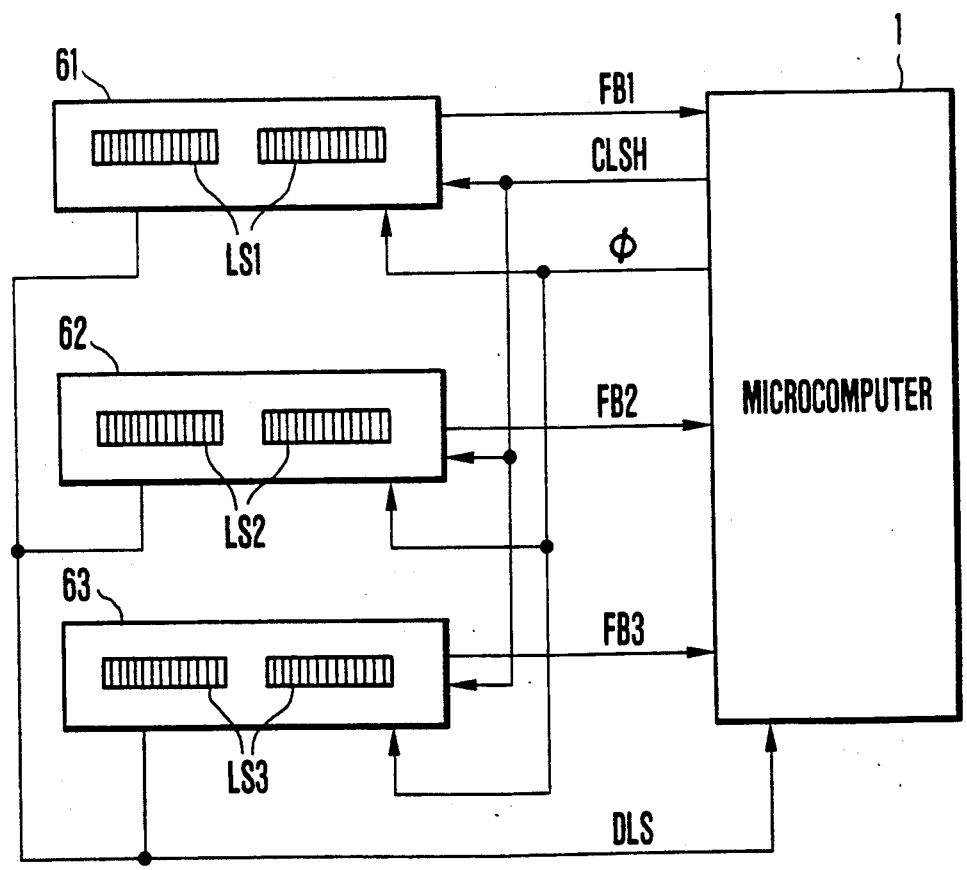
FIG. 4 is a block diagram showing by way of example the arrangement of a focus detecting circuit shown in FIG. 1.

FIG. 4 shows by way of example the arrangement of the focus detecting circuit 6 of FIG. 1. Referring to FIG. 4, each of focus detection units 61, 62 and 63 consists of the line sensor LS1, LS2 or LS3 and a circuit which is arranged to read out the result of accumulation from the line sensor.

After a focus detecting action, the camera operates as described below with reference to FIG. 4, etc.:

In response to a signal CLSH from the microcomputer 1, the line sensors LS1, LS2 and LS3 respectively begin to accumulate the result of photo-electric conversion. When the largest of electric charge amounts accumulated at picture elements forming each line sensor reaches a given value, the two units of the line sensors produce signals FB and stop accumulating. This action is performed independently by each of the focus detection units 61, 62 and 63. When the accumulating process comes to a stop, each sensor samples and holds its accumulated electric charge. Upon detection of receipt of the signals FB from all the focus detection units 61, 62 and 63, the microcomputer 1 produces a clock signal $\phi$. In accordance with this signal $\phi$, the focus detection units 61, 62 and 63 serially send the sampled-and-held accumulated electric charge to the microcomputer 1 as a signal DLS. Upon receipt of the signal DLS, the microcomputer 1 A/D-converts the signal DLS into a digital value. The microcomputer 1 computes a lens driving degree required for obtaining an in-focus state on the basis of the digital value thus obtained. Then, the microcomputer 1 conducts serial communication with the lens control circuit 2 on the basis of the result of the computation. The lens control circuit 2 then drives the focus adjustment motor on the basis of the data thus received. With respect to deciding on which of the sensitive areas of the line sensors LS1 to LS3 on the image plane the lens is to be focused, there are various known methods. In one of these methods, the lens is focused on the area of the nearest distance. In another known method, the lens is focused in such a way as to have all the areas within the depth of field.

Upon completion of the above-stated AF (automatic focusing) action, the microcomputer 1 supplies the flash light adjusting control circuit 5 with information as to which of zones is in focus or which of zones is within the depth of field, etc. Then, within the flash light adjusting control circuit 5, the control circuit 51 sends light adjustment gain information (or signals TTLG) to the light adjustment circuits 51, 52 and 53. After this, when the X-contact 10 is turned on the control circuit 51 produces a signal STA to cause the flash device 55 to begin to flash. At the same time, the circuit 51 produces signals TTLR to cause a light adjusting process to begin. Upon completion of the light adjusting process, the light adjustment circuits 52, 53 and 54 send signals CMP to the control circuit 51. Upon receipt of the signals CMP, the control circuit 51 produces a signal STP to stop the flash device 55 from flashing.

FIG. 5 shows the in-focus and defocus zones in relation to light adjustment gains and a relation between the signals CMP and STP. In FIG. 5, a control method is shown merely by way of example. The light adjustment gain is arranged to be set at any values according to the focused states including "adequate", "given step under" (i.e. under exposure by a given number of steps) and "given step over" (i.e. over exposure by a given number of steps). Further, the flashing stop control is performed not only by producing the signal STP in the case of "OR" (logical sum) but also may be performed by producing it in the event of "AND" (logical product) when all the signals CMP1 to CMP3 are produced. In a case where the light adjustment is to be corrected, the light adjustment gain correction either may be made both for the in-focus and defocus zones or may be made only for the in-focus zone.

FIG. 6(*a*) is a flow chart showing in outline the flow of a series of actions to be performed by the camera. When a shutter release button which is not shown is not pushed, the switch SW1 is in its off position. In this instance, a step S1 at which a switch position sensing action is performed, a step S2 at which a light measuring action is performed and a step S3 at which a display is made are repeatedly executed. When the release button is pushed to turn on the switch SW1 at a step S4, the flow proceeds from the step S4 to a step S5. At the step S5: An automatic focusing operation is performed, including a reading action on the focus detection sensor; computation; and a driving action on the motor provided for adjustment of the focus of the lens. At a next step S6: The gain of flash light adjustment is set on the basis of focus information obtained through the step S5. The camera becomes ready for light adjustment. At a step S7: The shutter is controlled to make an exposure for a given period of time. At the same time as this, the flash light is emitted and stopped. Upon completion of the shutter release action, the flow comes to a step S8. At the step S8: One frame amount of film is fed for a next shot.

FIGS. 6(*b*) and 6(*c*) are flow charts showing the steps S5 and S6 of FIG. 6(*a*) in further detail. Referring to FIG. 6(*b*), the details of the step S5 are as follows: At a step S5-0: The signal CLSH is sent to each of the sensors LS1, LS2 and LS3 to cause them to begin their accumulating actions. Upon detection that all the signals FB are output from these sensors after completion of their accumulating actions, the signal $\phi$ is produced to obtain the signals accumulated by the sensors in the form of the signal DLS.

At a step S5-1: The degrees of defocus of different areas are obtained on the basis of the electric charge accumulated by the sensors LS1, LS2 and LS3. At a step S5-2: The defocus degree of the nearest of defocus area is selected. At a step S5-3: Data corresponding to the defocus degree as selected is sent to the lens control circuit 2 to drive the lens accordingly. Step S5-4: The sensor (or area) which indicates a defocus degree differing to a degree within a given value from the defocus degree selected at the step S5-2 is selected.

Referring to FIG. 6(c), the details of the step S6 are as follows: At a step S6-1: The gain for the light adjustment sensors corresponding to the areas selected at the steps S5-2 and S5-4 is set at an adequate value A. At a step S6-2: The gain for the light adjustment sensor other than the above-stated sensors is set at a value B which is less than the value A. The data of gains A and B is sent to the control circuit 51 of FIG. 2 and is sent from the control circuit 51 to the light adjustment circuits as signals TTLG to be set there.

Figure 6A:
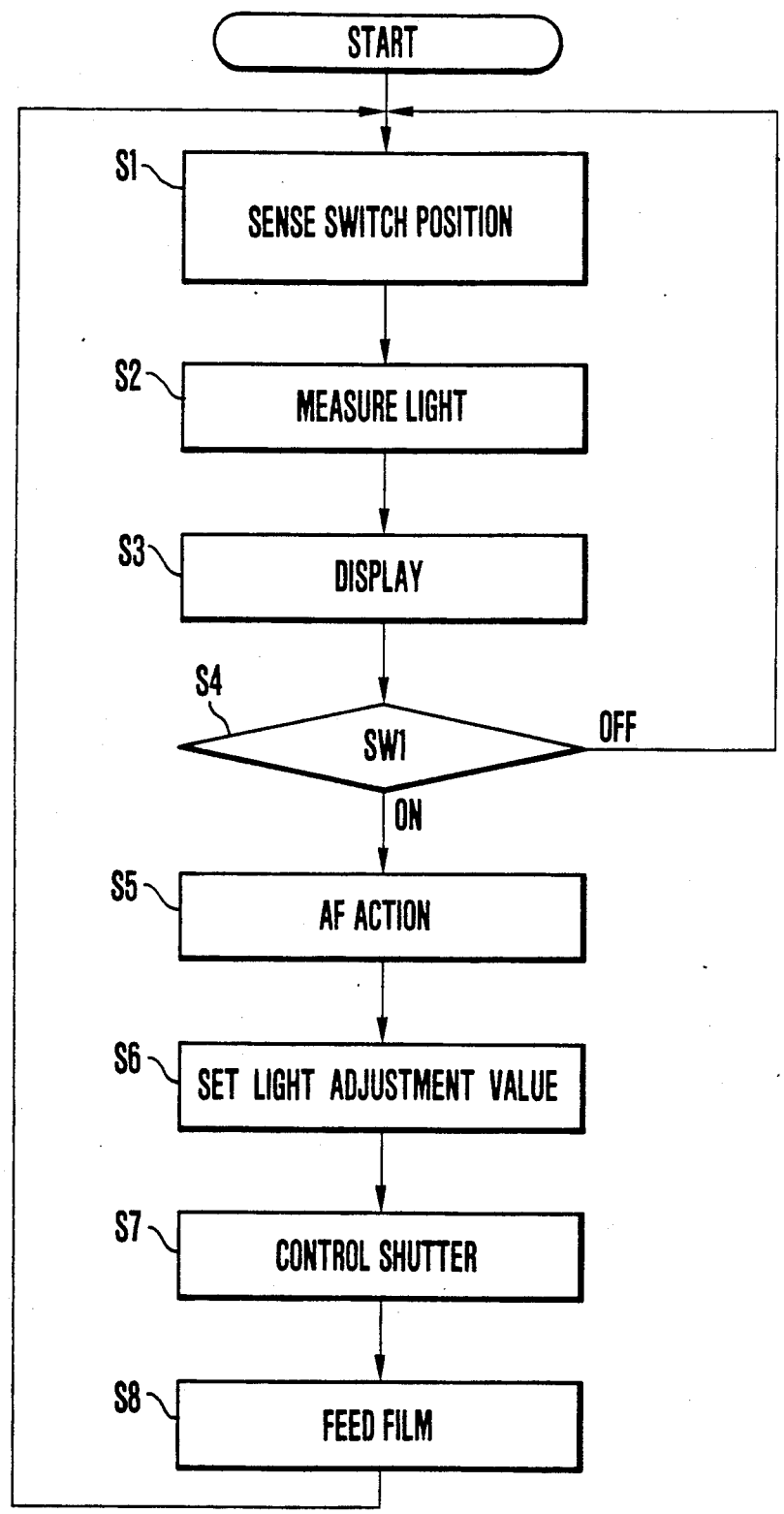

After the step S6-2, the flow comes to the step S7 of FIG. 6(a) for shutter control. In the shutter control, when the X-contact 10 is turned on by the travel of the leading shutter curtain, the control circuit 51 produces the signals STA and TTLR. Then, as described in the foregoing, the flash device 55 is allowed to flash. The integrating capacitor of each light adjustment circuit integrates the output of each sensor obtained from the reflected light of the flash light emitted from the flash device. When the integrated value reaches a given value at any of the light adjustment circuits, the circuit produces the signal CMP. Upon receipt of the signal CMP, the control circuit produces the signal STP to bring the flashing action of the flash device to a stop. At the time for the integrating action of each of the light adjustment circuits, the integrating action is performed according to the gain set as mentioned above.

Figure 6B:
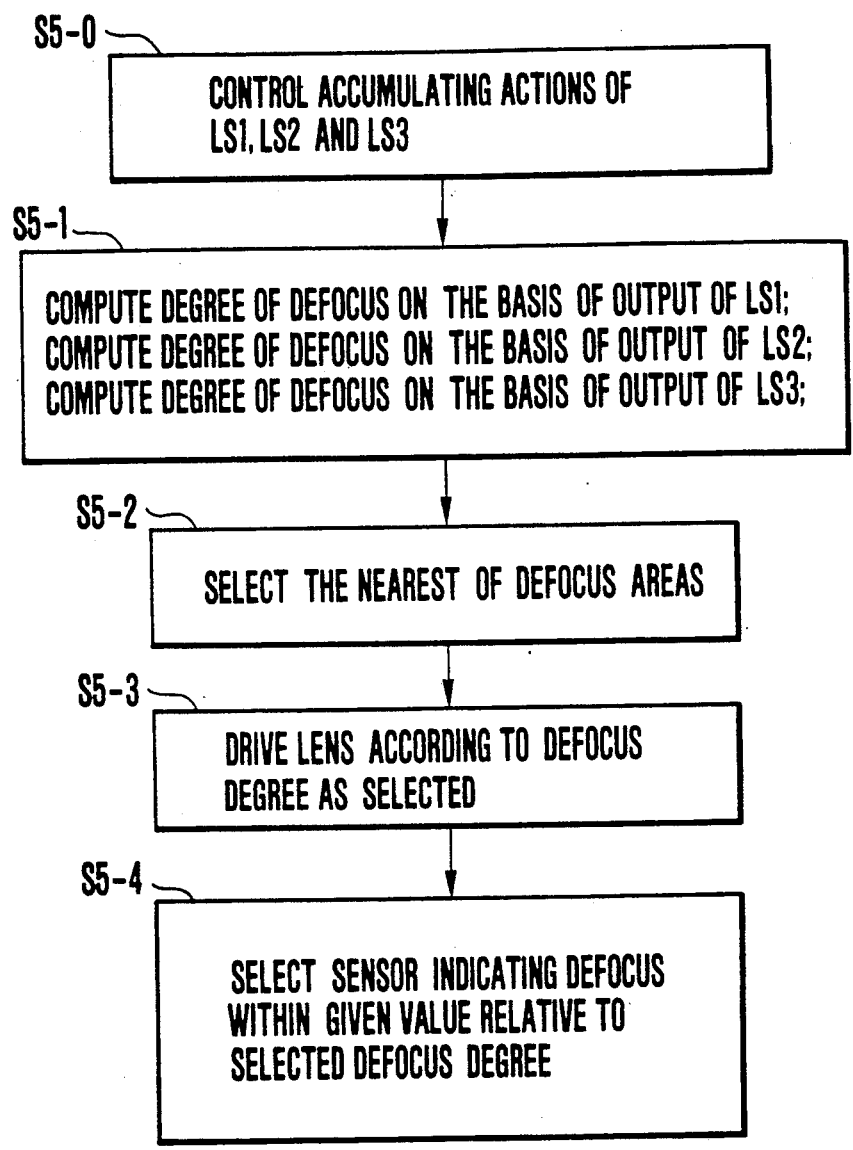

In the case of the embodiment described, the gains of the light adjustment sensors corresponding to sensors indicating the defocus degrees selected at the steps S5-2 and S5-4 in the flows of operation shown in FIGS. 6(b) and FIG. 6(c) are set at A. The gain of the light adjustment sensor other than the above-stated light adjustment sensors is set at B. However, this may be changed to be set at the value A only the gain of the light adjustment sensor corresponding to the sensor indicating the defocus degree selected at the step S5-2 and to render the light adjustment sensors other than the selected sensor inoperative. In that instance, the flash device is stopped from flashing when the integration output of the selected sensor reaches a given value.

FIG. 7 is a block diagram showing a flash light adjusting control circuit of a second embodiment of this invention. All other circuits of the camera are arranged to be the same as in FIG. 1. The flash light adjusting control circuit includes a control circuit 51, light measuring sensors PD1, PD2 and PD3, light adjustment sensors 52, 53 and 54 and a flash device 55 which are arranged in about the same manner as in the case of the flash light adjusting control circuit of FIG. 2. However, in addition to them, the flash light adjusting control circuit of FIG. 7 includes an addition circuit 56 and a level detection circuit 57.

The light adjustment circuits 52, 53 and 54 are arranged to produce, instead of the signals CMP, signals LVL1, LVL2 and LVL3 which indicate values obtained through the integrating actions of integrating capacitors. The addition circuit 56 is arranged to produce a signal ADL which is obtained by logarithmically converting and adding together the signals LVL1, LVL2 and LVL3. When the signal ADL exceeds a given value, the level detection circuit 57 produces a signal CMP. The actions of the control circuit 51 and other actions of the second embodiment are the same as those of the first embodiment. These actions include among others a light adjustment gain information (a signal TTLG) setting action, causing the flash device 55 to start flashing and stopping the flash device 55 from flashing after the signal CMP is supplied.

FIG. 8(a) shows changes brought about in the light quantity of the zones of the image plane with weight attached to the light adjustment gains by the second embodiment. In this case, the light adjustment gain information (the signal TTLG) is set with weighting in such a way as to cause the logarithmically converted signals LVL obtained when each zone is apposifely exposed to be in the ratio of 3:1:1. The weight attaching rate "3" is applied to the gain value A for the in-focus zone. With the weight attached in this manner, if the zone of the light adjustment sensor PD1 which is, for example, thus weighted comes to be over-exposed by one step while the zones of other light adjustment sensors PD2 and PD3 would be under-exposed by 1.5 steps respectively. In that instance, the signal CMP is produced with the zones of the sensors PD2 and PD3 under-exposed by 1.5 steps. In other words, the arrangement ensures that the weight attached zone has a nearly apposite exposure without being much affected by the luminance of other zones even in cases where other zones are excessively bright or dark. Therefore, the zones to which no weight is attached are allowed to have a degree of exposure which does not much deviate from an apposite degree of exposure. The embodiment thus gives a well balanced exposure for the image plane as a whole.

FIG. 8(b) shows a case where the weight is attached in the ratio of 8:1:1, instead of 3:1:1.

Figure 9A:
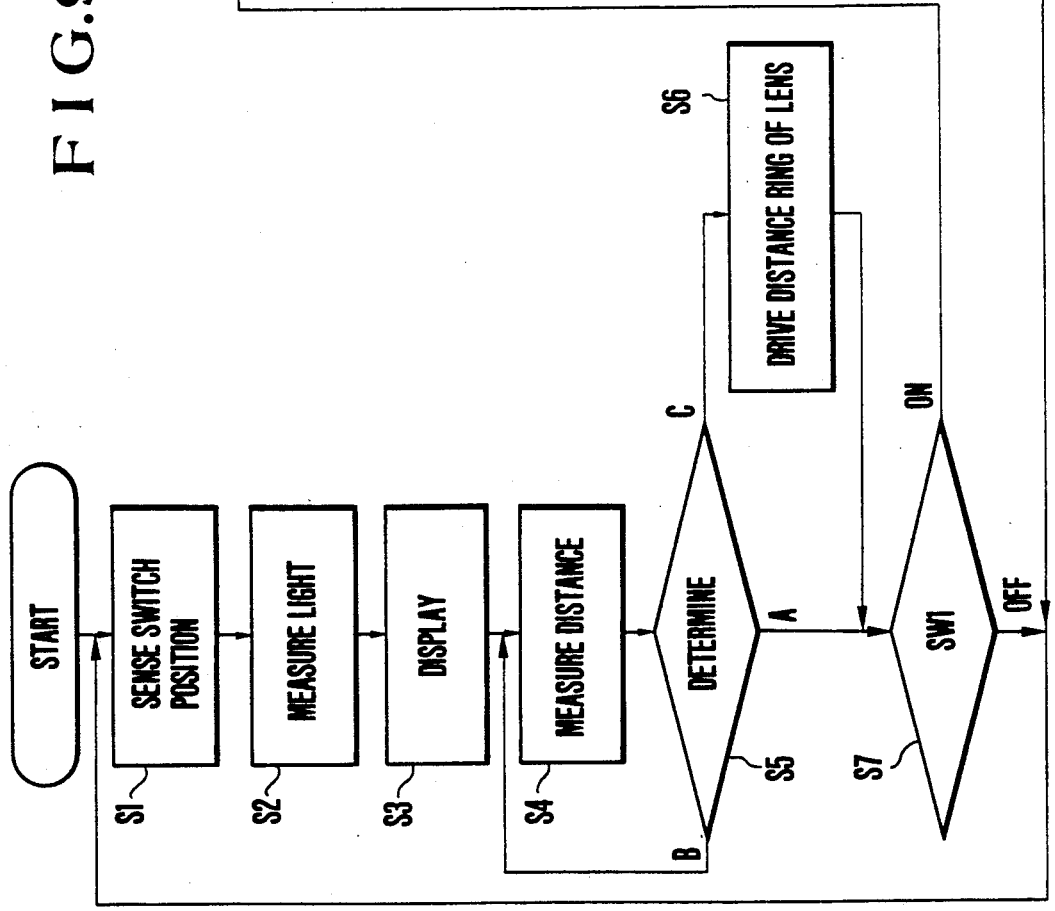

FIGS. 9(a), 9(b) and 9(c) show, in a flow chart and related illustrations, a series of actions performed by a camera which is arranged as another embodiment of this invention. In this case, the arrangement of the camera is assumed to be identical with the arrangement shown in FIGS. 1 through 4. The embodiment operates as follows:

At a step S1: A switch position sensing action is performed. At a step S2: A light measuring action is performed. At a step S3: Information on the result of the light measuring action, etc., is displayed. At a step S4: A distance measuring action is performed. At this step, the steps S5-0, S5-1, S5-2 and S5-4 of FIG. 6(b) are executed. The flow then comes to a step S5. At the step S5: A check is made for the current AF mode, focus holding or non-holding state and a predictable or non-predictable state. A decision is made as to whether the flow should come back to the step S4 or to proceed to a step S6 or to a step S7 (See FIG. 9(b)). More specifically, in a case where an in-focus state is already attained and held in the AF one-shot mode (a mode in which, once an in-focus state is attained, the in-focus state is held), the flow immediately comes to the step S7 without driving a distance ring provided at the lens. If no in-focus state has not been held as yet, the flow proceeds to a step S6. At the step S6: The distance ring is driven to hold an in-focus state and the flow comes to the step S7. In this instance, the lens is driven on the basis of the defocus degree of the nearest area selected at the step S5-2. Further, in the event of an AF predictive servo mode in which the movement of the object is predicted in such a way as to have an in-focus state at the time of shutter release, the flow comes back to the step S4 to repeat the distance measuring action if the number of distance-measuring-action repeating times is still insufficient for the prediction or proceeds to the step S6 if the distance measuring action has been repeated for a sufficient number of times. At the step S6, the in-focus state is held by driving the distance ring of the lens and the flow comes to the step S7. The one-shot mode or the predictive servo mode is selectable by a manual operation on a switch which is not shown. The selection of the mode is assumed to be detected at the step S1.

When the shutter release button has not been pushed, the steps S1 through S7 are repeated in sequence. When the release button is pushed, the flow proceeds from the step S7 to a step S8 to execute the following sequence of steps:

At the step S8: A distance measuring action is performed in the same manner as at the step S4. At a step S9: A check is made for the AF mode. If the AF mode is found to be the one-shot mode, the flow immediately comes to a step S11 without driving the distance ring of the lens. In a case where the AF mode is found to be the predictive servo mode at the step S9, the flow proceeds to a step S10. At the step S10: The object's position at the time of shutter release (exposure) is predicted by computation based on the data of distances repeatedly measured up to the current point of time. The distance ring of the lens is driven and shifted to a predicted in-focus position. The flow then proceeds to the step S11—see FIG. 9(c). At the step S11: A light adjustment level is set on the basis of information on the focused state of each area obtained from the latest result of distance measurement in the manner as shown in FIG. 6(c). Further, in the case of the predictive servo mode, the light adjustment level is set on the basis of information obtained by predicting the focused state anticipated to obtain at each of the areas (or zones) at the time of shutter release or exposure. Upon completion of preparation for the light adjustment control, the flow proceeds to a step S12. At the step S12: The shutter is controlled in such a way as to effect an exposure for a predetermined period of time. At this time, the flash device is caused to flash and is stopped from flashing. After completion of shutter release, the flow comes to a step S13 to have one frame amount of film fed for a next shot. These steps S12 and S13 are executed in the same manner as at the steps S7 and S8 of FIG. 6(a).

Figure 10A:
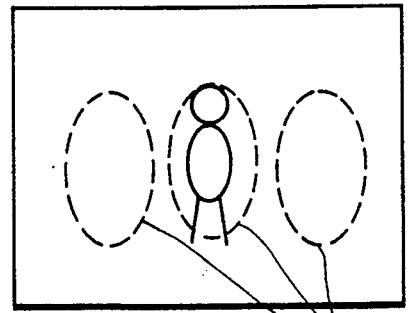
FIGS. 10(a), 10(b) and 10(c) show the operation of the third embodiment performed as shown in the flow chart of FIG. 9(a).
Figure 10B:
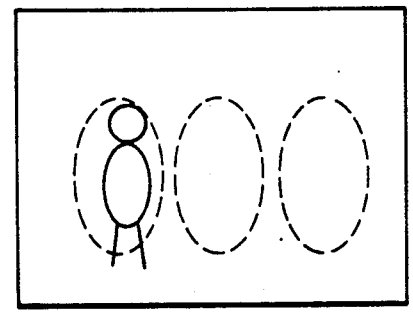
Figure 10C:
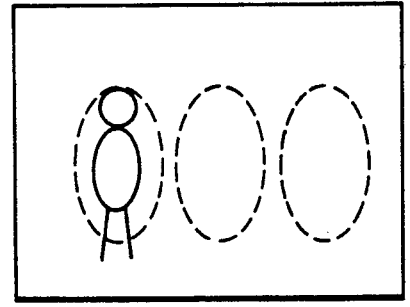

In accordance with the arrangement of this invention, a photographing shot can be made in a manner as shown in FIGS. 10(a) to 10(c) by selecting the AF one-shot mode. In the case of this shot (by changing the framing after an in-focus state has been held), the distances of a plurality of areas within an image plane are measured at the step S8 immediately before the shutter release; and then the amount of flash light is controlled by adjusting the light adjustment gain of each area on the basis of information on the focused state of each area (information on an in-focus state or a defocus state) at the step S11. Therefore, an exposure apposite to a main object is attainable by predicting, with some degree of accuracy, the position and the size of the main object within the image plane. Besides, the multi-light-adjusting camera according to this invention is capable of controlling the amount of flash light for an apposite exposure to have the main object and the background thereof in a well balanced state.

When an in-focus state is obtained once by the AF action, the main object is in the sensitive area of a light measuring sensor located in the central part of the image plane as shown in FIG. 10(a). After that, if the photographer relocates and brings the main object to the left side of the image plane, the AF action is locked there as the camera is in the AF one-shot mode. In other words, there obtains the state of FIG. 10(b) while the in-focus state first obtained is kept unchanged. The main object is thus located within the sensitive area of a light measuring sensor located on the left side of the image plane. With a picture composed in this manner, when the photographer performs a shutter release operation, the focused state obtained for each area is determined by a distance measuring action performed immediately before shutter release. Then, as shown in FIG. 10(c), the main object remains at the time of exposure in the same position as in the case of FIG. 10(b). The focused state at the time of exposure thus can be determined. The light adjustment gains for the areas are evaluated on the basis of the results of determination of the focused states, so that the amount of flash light can be adequately controlled.

Figure 11A:
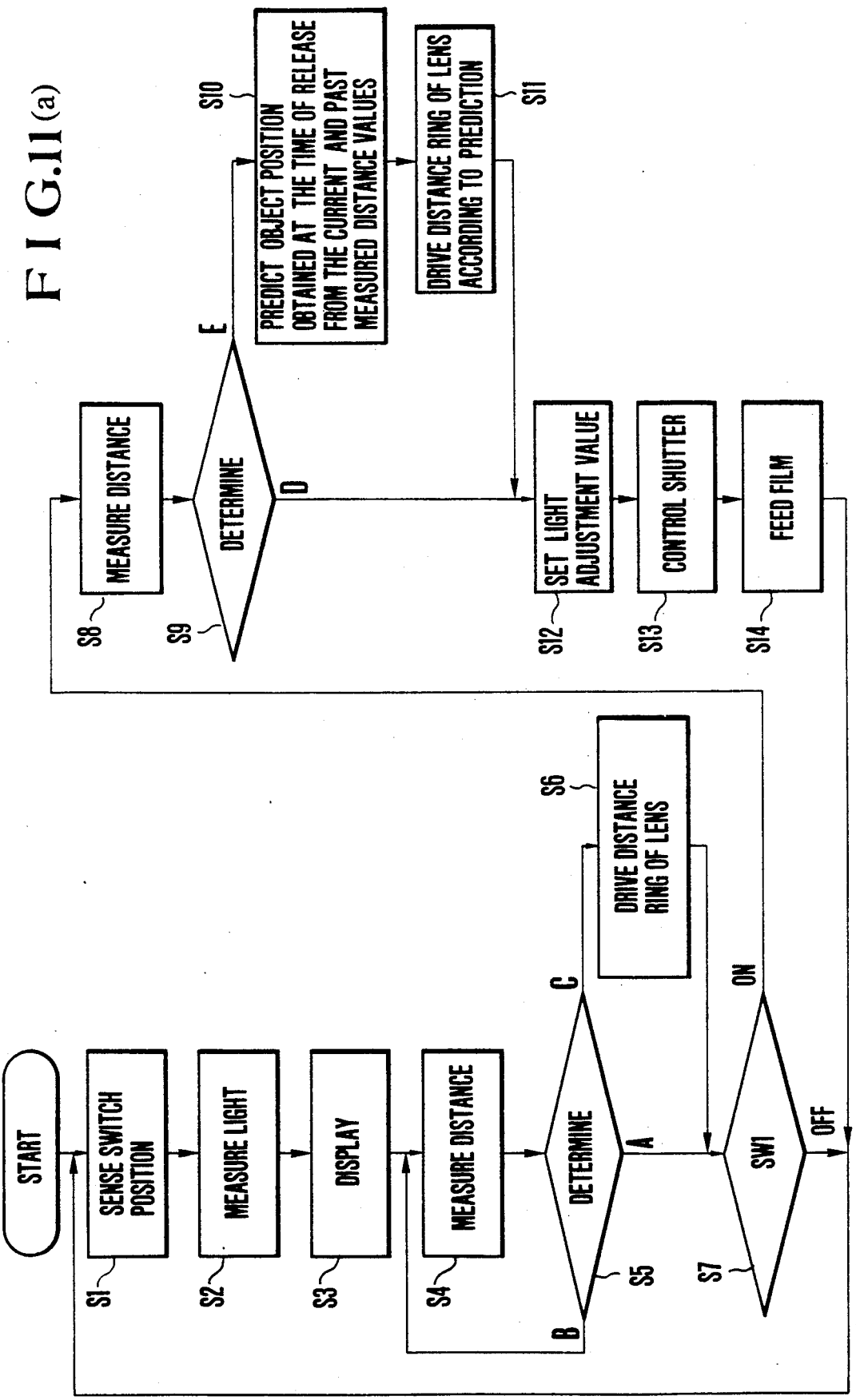

FIGS. 11(a) to 11(c) show, in a flow chart and related illustrations, the flow of a series of actions to be performed by a camera which is arranged as a further embodiment of this invention. At a step S1 of FIG. 11(a): A switch position sensing action is performed. At a step S2: A light measuring action is performed. At a step S3: Information on the result of light measurement, etc., is displayed. At a step S4: A distance measuring action is performed and then the flow proceeds to a step S5. At the step S5: A check is made for the kind of the AF mode currently selected to find an in-focus position holding state or a non-holding state and a predictable state or an unpredictable state. The flow either comes back to the step S4 or comes to a step S6 or to a step S7 according to the result of the check—see FIG. 11(b). More specifically, if an in-focus state is already held in the AF one-shot mode (in which an in-focus state is held once the in-focus state is attained), the flow comes to the step S7 without driving the distance ring of the lens. If any in-focus state is not held as yet, the flow comes to the step S6. At the step S6: An in focus state is held by driving the distance ring of the lens and the flow comes to the step S7. Further, in a case where the AF mode is found at the step S5 to be the AF predictive servo mode (in which the movement of the object is predicted in such a way as to have an in-focus state at the time of shutter release), the flow comes back to the step S4 to repeat the distance measuring action if the number of times for which the distance measuring action is repeated is considered to be insufficient for prediction. The flow comes to the step S6 if the distance measuring action is considered to have been repeated for a sufficient number of times for prediction. Then, at the step S6, an in-focus state is held by driving the distance ring of the lens and the flow proceeds to the step S7.

At the step S7: A check is made for the position of the shutter release button. If the release button has not been pushed, the sequence of steps from the step S1 through the step S7 are repeated. When the release button is found to have been pushed, the flow comes from the step S7 to a step S8 to execute a sequence of steps in the following manner:

At the step S8: A distance measuring action is performed. At a step S9: A check is made for the kind of the AF mode. If the mode is found to be the AF one-shot mode, the flow immediately proceeds to a step S12. If the mode is found to be the AF predictive servo mode, the flow comes to a step S10. At the step S10: The position of the object at the time of shutter release (or exposure) is predicted by computation on the basis of data of measured distances obtained up to the current point of time. At a step S11: The distance ring of the lens is driven and shifted to the predicted in-focus position— see FIG. 11(c). The flow then comes to the step S12. At the step S12: A light adjustment level is set. In the case of the AF one-shot mode, the light adjustment level is set according to in-focus or defocus information on each area obtained by the latest distance measuring action. In the event of the AF predictive servo mode, the light adjustment level is set on the basis of information obtained through the step S10 at which the prediction is made for the focused state of each area (the position of the main object within the image plane) which is expected to obtain at the time of shutter release (or exposure). Upon completion of preparation for the light adjustment control, the flow proceeds to a step S13. At the step S13: The shutter is controlled to effect an exposure for a given period of time. At this time, the flash device is caused to flash and to be stopped from flashing. After completion of the shutter release, the flow comes to a step S14 to feed one frame amount of film for a next shot. The step S10 of this flow of operation differs from that of the flow shown in FIG. 9(a). With the exception of the step S10, the flow is identical with the flow of FIG. 9(a).

The following further describes the method for the prediction to be made at the above-stated step S10 in the AF predictive servo mode:

The focused state of each area is first detected by performing the distance measuring action before shutter release to find which of the sensitive areas has the image of the main object. The process of measuring distance and the processes of finding the focused state and the location of the main object are repeated before the shutter release. After commencement of the shutter release, the sensitive area of one of the light measuring sensors in which the main object is likely to exist at the moment of exposure is predicted (by executing the step S10 of FIG. 11(a)). For example, the image plane is divided into a total of 12 areas (1) to (12) for light and distance measurement as shown in FIGS. 12(a) to 12(c). Assuming that the main object which is a child or a car or the like, for example, is running from the left side to the right side of the image plane as shown in FIGS. 12(a) to 12(c), the operation in the predictive servo mode is performed in the following manner: The exposure is predicted to be made when the main object has moved from the area (5) in which it is located immediately before the shutter release to another area (6) during a release time lag period. Then, for example, the light adjustment gain is set on the assumption that the area (7) will be within an in-focus zone.

FIG. 13 is a flow chart showing the details of the Step S10 of FIG. 11(a). At the step S1 of FIG. 13: A check is made to find which of the areas LS1, LS2 and LS3 shown in FIG. 3 is the defocus area selected according to the result of focus detection obtained by executing the step S4 of FIG. 11(a). Steps S2-1, S2-2 and S2-3: A check is made to find which of the the areas LS1, LS2 and LS3 is the area selected according to the result of focus detection obtained by executing the step S8 of FIG. 11(a). Through these steps, the change of area of a focusing object can be found from a focused state detected by a round of focus detection immediately before shutter release and a focused state which is detected by a previous round of focus detection made one round before.

Therefore, when the selecting area changes from the area LS2 to the area LS1, the area LS3 is designated at a step S3-3. Then, at the step S12 of FIG. 11(a), the area LS3 is assumed to be an in-focus area and the light adjustment value (gain) is set in such a way as to cause the sensor PD3 which corresponds to the area LS3 to produce its output at an apposite value, with the output of the sensor PD3 assumed to be the sensor output for an in-focus zone. In that instance, the light adjustment values for other areas are set in such a way as to have them overexposed.

Further, in a case where the area changes from the area LS3 to LS1, the area LS2 is designated as in-focus zone at a step S3-1 and the light adjustment value is set in the above-stated manner. In other cases, the light adjustment value is set by selecting an area as an in-focus zone according to the result of focus detection made immediately before the shutter release.

What is claimed is:

1. A flash photographing system for photographing with flash light of a flash device, comprising:
    a) a light measuring circuit which individually measures light of a plurality of areas of an image field, said light measuring circuit being arranged to measure reflected light coming from a photographed object as a result of flashing in case of flash photography;
    b) a focus detecting circuit which performs a focus detecting action on each of different areas of said image field;
    c) a setting circuit which sets the flash light quantity condition on the basis of a focused state of each of said areas detected by said focus detecting circuit; and
    d) a light quantity control circuit including an integrating circuit arranged to perform an integrating action on the light measurement output of said light measuring circuit for each of said areas and a stopping circuit arranged to stop the flash light from being emitted when an output of said integrating circuit reaches a predetermined value, said integrating action being performed in accordance with each flash light adjusting condition set by said setting circuit.

2. A system according to claim 1, wherein said setting circuit is arranged to set said condition differently for a light measurement output of said light measuring circuit obtained for an area which, among said plurality of areas, indicates an in-focus state from conditions set for light measurement outputs obtained for other areas.

3. A system according to claim 1, further comprising a lens driving circuit arranged to drive a lens to focus the lens on a photographed object located in one of said plurality of areas on the basis of the result of focus detection obtained for said area, and wherein said setting circuit is arranged to set said condition for a light measurement output of said light measuring circuit for said area differently from light measurement outputs for other areas.

4. A flash photographing system according to claim 1, wherein said integrating circuit integrates the light measurement outputs of each of the areas independently and the stopping circuit stops emission of the flash light when any one of outputs of the integration reaches a predetermined value.

5. A flash photographing system for photographing with flash light of a flash device, comprising:

a) a light measuring circuit which individually measures light of a plurality of areas of an image field, said light measuring circuit being arranged to measure reflected light coming from a photographed object as a result of flashing in case of flash photography;

b) a focus detecting circuit which performs a focus detecting action on each of different areas of said image field;

c) an evaluating condition setting circuit arranged to determine an evaluating condition for a light measurement output obtained for each of said areas on the basis of a focused state of each of said areas detected by said focus detecting circuit; and d) a light quantity control circuit including an integrating circuit arranged to perform an integrating action on the light measurement output of said light measuring circuit for each of said areas and a stopping circuit arranged to stop the flash light from being emitted when an output of said integrating circuit reaches a predetermined value, said integrating action being performed in accordance with each evaluating condition determined by said setting circuit.

6. A system according to claim 5, wherein said setting circuit is arranged to set said condition differently for a light measurement output of said light measuring circuit obtained for an area which, among said plurality of areas, indicates an in-focus state from conditions set for light measurement outputs obtained for other areas.

7. A system according to claim 5, further comprising a lens driving circuit arranged to drive a lens to focus the lens on a photographed object located in one of said plurality of areas on the basis of the result of focus detection obtained for said area, and wherein said setting circuit is arranged to set said condition for a light measurement output of said light measuring circuit for said area differently from light measurement outputs for other areas.

8. A system according to claim 5, wherein said setting circuit is arranged to attach weight to each of said light measurement outputs.

9. A flash photographing system according to claim 5, wherein said integrating circuit integrates the light measurement outputs of each of the areas independently and the stopping circuit stops emission of the flash light when any one of outputs of the integration reaches a predetermined value.

10. A flash photographing system for photographing with flash light of a flash device, comprising:
a) a light measuring circuit which individually measures light of a plurality of areas of an image field, said light measuring circuit being arranged to measure reflected light coming from a photographed object as a result of flashing in case of flash photography;

b) a focus detecting circuit which performs a focus detecting action on each of different areas of said image field;

c) an evaluating condition setting circuit arranged to determine an evaluating condition for a light measurement output obtained for each of said areas on the basis of a focused state of each of said areas detected by said focus detecting circuit; and d) a light quantity control circuit including an integrating circuit arranged to perform an integrating action on the light measurement output of said light measuring circuit for each of said areas and a stopping circuit arranged to stop the flash light from being emitted when the sum of the outputs of said integrating circuit reaches a predetermined value, said integrating action being performed in accordance with each evaluating condition determined by said setting circuit.

11. A camera system comprising:
a) a light measuring circuit arranged to individually measure light of a plurality of areas of an image field;

b) a focus detecting circuit which performs a focus detecting action on each of different areas of said image field;

c) a lens driving circuit arranged to adjust focus by driving a lens on the basis of the result of the focus detecting action of said focus detecting circuit;

d) holding means arranged to hold said lens in a focus-adjusted position after said lens is driven to the focus-adjusted position by said lens driving circuit and to inhibit any lens driving action thereafter;

e) an evaluation circuit which evaluates the light measurement outputs of each of said areas measured by said light measuring circuit on the basis of the focus states of each of said areas detected by said focus detecting circuit after the lens is held at a focus-adjusted position by said holding means but immediately before a release operation; and f) an exposure control circuit arranged to perform exposure control on the basis of said evaluated light measurement output.

12. A system according to claim 11, wherein said exposure control circuit is arranged to control the quantity of flash light to be emitted.

13. A camera system, comprising:
a) a light measuring circuit arranged to individually measure light of a plurality of areas of an image field;

b) a focus detecting circuit which performs a focus detecting action on each of different areas of said image field;

c) a computing circuit arranged to predict by computation the position of a photographed object to be obtained within an image field after the lapse of a predetermined period of time on the basis of a focused state of each of said areas detected in the past by said focus detecting circuit;

d) an evaluation circuit arranged to evaluate an output of said light measuring circuit obtained for an area corresponding to a position predicted by said computing circuit in a manner different from a manner in which outputs of said light measuring circuit for areas other than said area are evaluated; and e) an exposure control circuit arranged to perform exposure control on the basis of said evaluated light measurement output, said exposure control circuit being arranged to control the quantity of flash light to be emitted.

14. A camera system comprising:
a) a light measuring circuit arranged to individually measure light of a plurality of areas of and image field;

b) a focus detecting circuit which performs a focus detecting action on each of different areas of said image field;

c) a lens driving circuit arranged to select the result of focus detection detected from one of said areas by said focus detecting circuit and to drive a lens for focus adjustment on the basis of said result of focus detection;

d) holding means arranged to hold said lens in a focus-adjusted position after said lens is driven to the focus-adjusted position by said lens driving circuit and to inhibit any lens driving action thereafter;

e) a selection circuit which selects a light measuring area on the basis of the focus states of each of said areas detected by said focus detecting circuit after the lens is held at a focus-adjusted position by said holding means but immediately before a release operation; and f) an exposure control circuit which performs exposure control on the basis of a light measurement output of said light measuring circuit obtained from said area selected by said selection circuit.

15. A system according to claim 14, wherein said exposure control circuit is arranged to control the quantity of flash light to be emitted.

16. A camera system, comprising:

a) a light measuring circuit arranged to individually measure light of a plurality of areas of and image field;

b) a focus detecting circuit which performs a focus detecting action on each of different areas of said image field;

c) a computing circuit arranged to predict by computation the position of a photographed object to be obtained within an image field after the lapse of a predetermined period of time on the basis of a focused state of each of said areas detected in the past by said focus detecting circuit; and d) an exposure control circuit arranged to perform exposure control on the basis of an output of said light measuring circuit obtained for an area corresponding to a position predicted by said computing circuit, said exposure control circuit being arranged to control the quantity of flash light to be emitted.

17. A flash photographing system for photographing with flash light of a flash device, comprising:

a) a light measuring circuit which individually measures light of a plurality of areas of an image field, said light measuring circuit being arranged to measure reflected light coming from a photographed object as a result of flashing in case of flash photography;

b) a focus detecting circuit which performs a focus detecting action on each of different areas of said image field;

c) a setting circuit which sets the flash light quantity condition on the basis of a focused state of each of said areas detected by said focus detecting circuit; and d) a light quantity control circuit including an integrating circuit arranged to perform an integrating action on the light measurement output of said light measuring circuit for each of said areas and a stopping circuit arranged to stop the flash light from being emitted when the sum of outputs of said integrating circuit reaches a predetermined value, said integrating action being performed in accordance with each flash light quantity condition determined by said setting circuit.

* * * * *